US006364491B1

(12) United States Patent
Okada et al.

(10) Patent No.: US 6,364,491 B1
(45) Date of Patent: Apr. 2, 2002

(54) LIQUID CRYSTAL PROJECTOR

(75) Inventors: Takehiro Okada; Masanari Hashimukai, both of Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/495,058

(22) Filed: Jan. 31, 2000

(30) Foreign Application Priority Data

Jan. 29, 1999 (JP) .......................................... 11-021901
Sep. 27, 1999 (JP) .......................................... 11-272383

(51) Int. Cl.$^7$ ............................................... G03B 21/14
(52) U.S. Cl. ...................................... 353/101; 353/119
(58) Field of Search ................................ 353/101, 119, 353/100, 69, 70

(56) References Cited

U.S. PATENT DOCUMENTS

| 2,429,164 A | * | 10/1947 | Mast et al. | |
| 4,607,924 A | * | 8/1986 | Vance | 353/101 |
| 4,744,652 A | * | 5/1988 | Lindsey | 353/101 |
| 4,863,263 A | * | 9/1989 | Kanai | 353/101 |
| 5,636,913 A | * | 6/1997 | Park | 353/101 |
| 5,788,355 A | * | 8/1998 | Na | 353/101 |
| 5,868,483 A | * | 2/1999 | Okada et al. | 353/101 |
| 5,895,110 A | | 4/1999 | Okada et al. | 353/31 |

FOREIGN PATENT DOCUMENTS

| JP | 5-27324 | 2/1993 |
| JP | 6-14326 | 1/1994 |
| JP | 6-331953 | 12/1994 |
| JP | 8-160488 | 6/1996 |
| JP | 9-138377 | 5/1997 |
| JP | 10-171044 | 6/1998 |

\* cited by examiner

*Primary Examiner*—William Dowling
(74) *Attorney, Agent, or Firm*—Ratner & Prestia

(57) ABSTRACT

A projector that can project a picture up and down on a screen free from the trapezium deformation, and allows the projection lens to be exchanged with other projection lens by an easy operation from outside of the front panel, without necessitating dismounting of any of the internal structure of projection apparatus. Projection lens shifts its standing up and down in accordance with revolving of a revolving knob disposed on the upper part of the projection apparatus. For the exchange of projection lens, a projection lens can be unscrewed and detached from the outer cylindrical section 9-2 of lens holding member 9 by turning the inner barrel 8 from outside the cabinet at the front.

17 Claims, 14 Drawing Sheets

LIQUID CRYSTAL PROJECTOR

FIELD OF THE INVENTION

The present invention relates to a liquid crystal projector for projecting an image in liquid crystal panel, or the like image, enlarged on a screen; more specifically, a liquid crystal projector that can move the place of a picture projected on the screen by shifting the standing of projection lens up and down, and facilitates easy exchange of the projection lens. Cine film projection lenses can also be used in the present liquid crystal projector.

BACKGROUND OF THE INVENTION

There have been projectors available in the market for magnifying and projecting an image in liquid crystal panel on a screen using a metal halide lamp, etc. as the light source. In such projectors, the light from a light source is concentrated via mirrors, or other such means, on a liquid crystal panel, and an image existing in the liquid crystal panel is projected through a projection lens on the screen.

Normally in a projector, the center of liquid crystal panel is located on the optical axis of projection lens, hence a picture is projected on a screen with its center and the optical axis of projection lens met. If standing of the projection lens is shifted upward relative to the liquid crystal panel, place of the picture on screen also shifts upward.

The projector is usually placed on a desk top. However, because a preferred positioning of projected picture is usually higher than the desk top, the projector is often uplifted in its front part by, for example, extending front feet of the projector. A drawback with the above described arrangement is that a projected picture is distorted to a trapezium shape. As means for solving the above described drawback, a projection apparatus is designed so, as it can shift the optical axis of projection lens relative to the center axis of liquid crystal panel, and project an image with the respective axes dislocated from each other.

It is a common practice with a floor setting type projector to shift a projected picture to be higher than the optical axis of projection lens; whereas with a ceiling-hanging projector, the projected picture is shifted downward.

Prior art mechanism's for shifting the optical axis of lens are illustrated in FIG. 13–FIG. 14. FIG. 13 is a perspective view of such a mechanism disclosed in the Japanese Patent Laid-open No.5-27324. In which mechanism, a condenser lens 82 and a projection lens unit 83 mounted on an arm 84 may be moved up and down by turning a screw shaft 85. The optical axis is thus shifted from the center axis of a liquid crystal panel 81.

FIG. 14 is a side view of such a mechanism disclosed in the Japanese Utility Model Laid-open No.5-21246. In which mechanism, a projection lens 91 is placed on a pantograph pedestal supported with an operation link 92 and a link,93, and the projection lens 91 is shifted up and down, while being kept in parallel, by turning of a gear 94 engaged with the operation link 92.

A simplified version of the above mechanism is proposed by the inventor in the Japanese Patent Laid-open No.10-171044. The proposal is based on a basic concept of projecting a picture of 40 inch (approximately 1.0 meter) size on a screen placed at projection distance 1.5 m–2 m with a projection lens (hereinafter referred to as standard lens).

Generally, a projector is installed at an appropriate place considering the distance from screen. However, depending on given conditions of the projecting environment, a projector may be required to be located at a place closer to the screen, or at a place away from the screen. In such cases, the projection lens needs to be replaced with other lens that matches a given projection distance. In the mechanism as proposed in the Japanese Patent Publication No.H10-171044, how ever, cabinet has to be taken off and some of the inner structures need to be dismounted before it turns out to be possible to replace the standard lens with other projection lens. Thus the lens exchange requires a complicated operation, and is a time consuming operation.

The luminance level has become significantly higher with recent projectors. Speaking of the projection lens, a lens of long focal distance is needed to project a picture in a certain predetermined dimensions on a screen of a large hall, where there is a long projection distance to the screen from a projection apparatus installed in the back wall; whereas a projection lens of short focal distance is needed in a case of projection in a home theater, for example. It is requested for a projection apparatus to be compatible with varieties of lens systems of different focal lengths, in order to be able to comply with various projection environments, viz. various projection distances and various screen dimensions. The projection apparatus are also requested to have such a lens shift mechanism that can shift the standing of optical axis of a projection lens.

Any of the liquid crystal projectors having a lens shift mechanism, three-plate or single-plate configuration, have been designed so as to be able to shift the optical axis of projection lens relative to the center axis of liquid crystal panel. The lens shift mechanism employed in the above-proposed projection apparatus is complicated in the structure with a large number of assembly components; hence the projection apparatus are expensive in the manufacturing cost. Furthermore, it is difficult for the above mechanism to afford a sufficient quantity of shifting; the quantity of shift made available by the mechanism remains to be insufficient for meeting a targeted quantity of lens shift. (ref.: FIGS. 13, 14)

In most of the practical application environments, a place for installing a projector and a location where screen is located have been determined as fixed conditions that can not be changed (in a case of ceiling-hanging projector, for example, the distance to screen and the fixture on ceiling provided for installation of projection apparatus are already determined). After a projection apparatus has been installed on the fixture, the projection lens is shifted up or down to adjust the location of a projected picture. If a standard lens does not fit to the given projection distance, it needs to be replaced with other projection lens. The lens exchanging operation under such a circumstance is quite troublesome and time consuming.

In order to use a projection apparatus in a cinema hall, for example, where the screen dimensions and the distance thereto are already fixed, quite a number of various projection lenses have to be made available. It has been an earnest request among the customers in the projector market to use the conventional cine film projection lenses already at their hands in a liquid crystal projector.

SUMMARY OF THE INVENTION

The present invention addresses the above problems and tasks, and offers a liquid crystal projector that comprises:
 a. a light source,
 b. a group of mirrors for splitting/composing color beam from the light source,
 c. a liquid crystal panel for controlling the transmission of color beam, d. a lens holding member that can slide up and down provided with an opening, e. a shift rod coupled revolvable with said lens holding member, and f. a cabinet for housing said liquid crystal panel, said group of mirrors, said lens holding member and said shift rod, provided with a first hole at a place above said shift rod and a second hole at a place corresponding to the opening of said lens holding member.

A projection lens unit for enlarging and projecting an image of light transmitted from the liquid crystal panel can be mounted to the opening of said lens holding member, or detached therefrom, by turning the lens unit inserted through the second hole of the cabinet.

The lens holding member is formed of
a fixing section for fixing a projection lens at an end,
a fitting section for providing a sliding support, and
a nut section which is to be engaged with screw section of the shift rod.

The projection lens unit consists of a plurality of lens barrels and a plurality of unit lenses, and one of the lens barrels is provided with a fixing section for engagement with the lens holding member.

In a liquid crystal projector configured as above, the projection lens unit can be shifted up and down, furthermore the projection lens unit itself can be exchanged with other projection lens by a simple one-touch operation from the front face of cabinet.

The lens holding member is supported in a sliding manner by an optical base, on which optical base the liquid crystal panel is installed, with a sliding section that couples with the fitting section of the lens holding member. The lens holding member moves up and down while holding the projection lens unit as it is, along with revolution of the shift rod.

With a liquid crystal projector of the present invention, in which it has been configured so as a projection lens unit can be attached and detached through a second hole of the cabinet, both of the operations for exchanging projection lens unit and for shifting the projection lens unit up and down can be performed without taking the cabinet off the projection apparatus.

In a liquid crystal projector of the present invention, which has been configured so that the entire projection lens unit is integrated as a single-piece component detachable from the optical base, hardly any additional cost is required for implementing the above described mechanism, without incurring any increase in the number of assembly parts and components.

With a liquid crystal projector of the present invention, a standard projection lens may be exchanged to other projection lens at any time, without the need of taking the cabinet off the projection apparatus and dismounting constituent component parts and mechanisms down to a level at which the lens exchange operation turns out to be possible for the projection apparatus.

Thus, even in a situation where a place for installing projector and the screen location have already been determined and unchangeable, positioning of a projected picture can be adjusted by shifting the projection lens up or down, without causing a trapezium distortion. If a projection apparatus is tilted for adjusting the positioning of projected picture, the trapezium distortion is unavoidable with the projected picture. Furthermore, when a standard projection lens does not fit to the given projection distance, it can be replaced easily with other suitable projection lens.

DETAILED DESCRIPTION OF THE PREFERRED EMBODIMENTS

Exemplary liquid crystal projectors in accordance with the present invention are described in the following referring to FIG. 1 through FIG. 12.

Embodiment 1

Figure 1A:
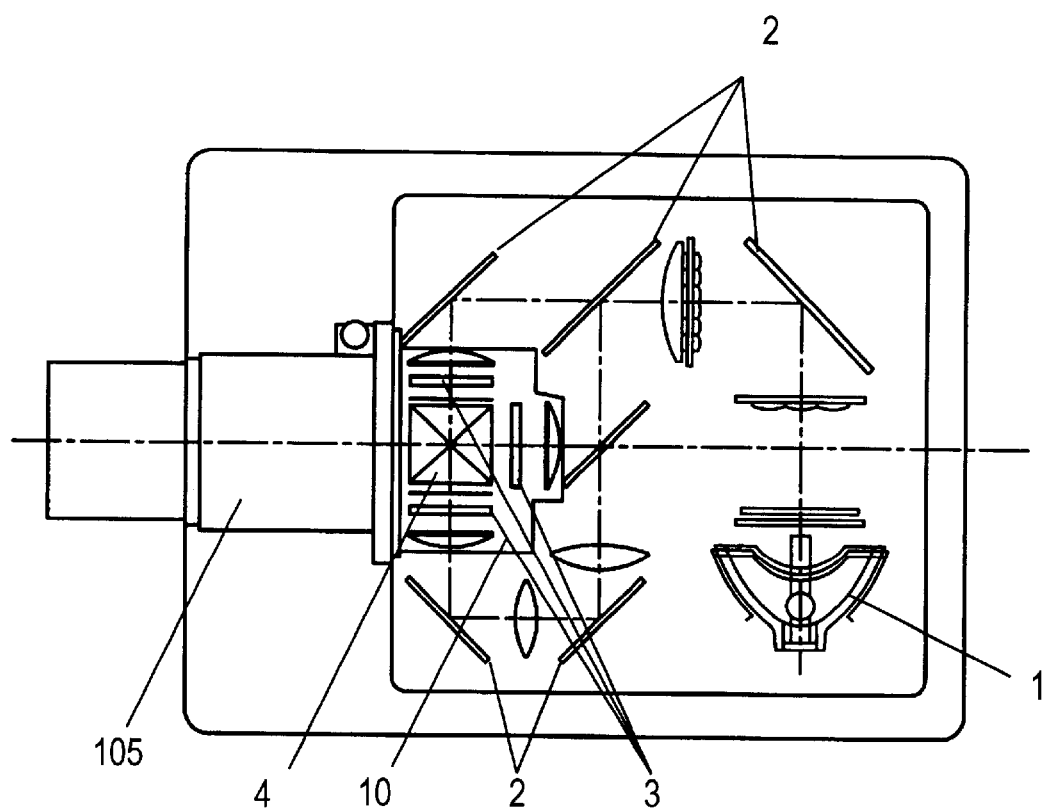
FIG. 1A is a plane view showing an optical system in a liquid crystal projector in accordance with a first exemplary embodiment of the present invention.
Figure 1B:
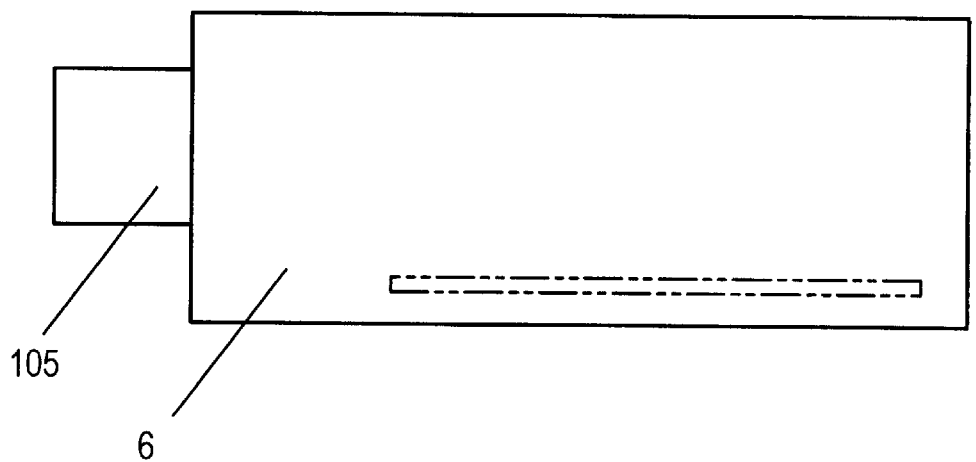
FIG. 1B shows elevation of the projector of FIG. 1A.

Referring to FIG. 1A and FIG. 1B, a three-plate liquid crystal projector is formed of a lamp (light source) 1, a plurality of mirrors 2, a liquid crystal panel 3, a prism 4, a projection lens unit 105, and an optical base, etc. plus a cabinet 6 for housing the above described structures. The light from the lamp (light source) 1 is split by means of the pluralities of mirrors 2 into the red, green and blue color beams, and the split beams respectively travel to the liquid crystal panel 3 to be guided to the prism 4 for composition. The composed light goes to the projection lens unit 105 to be projected magnified on a screen.

Figure 2:
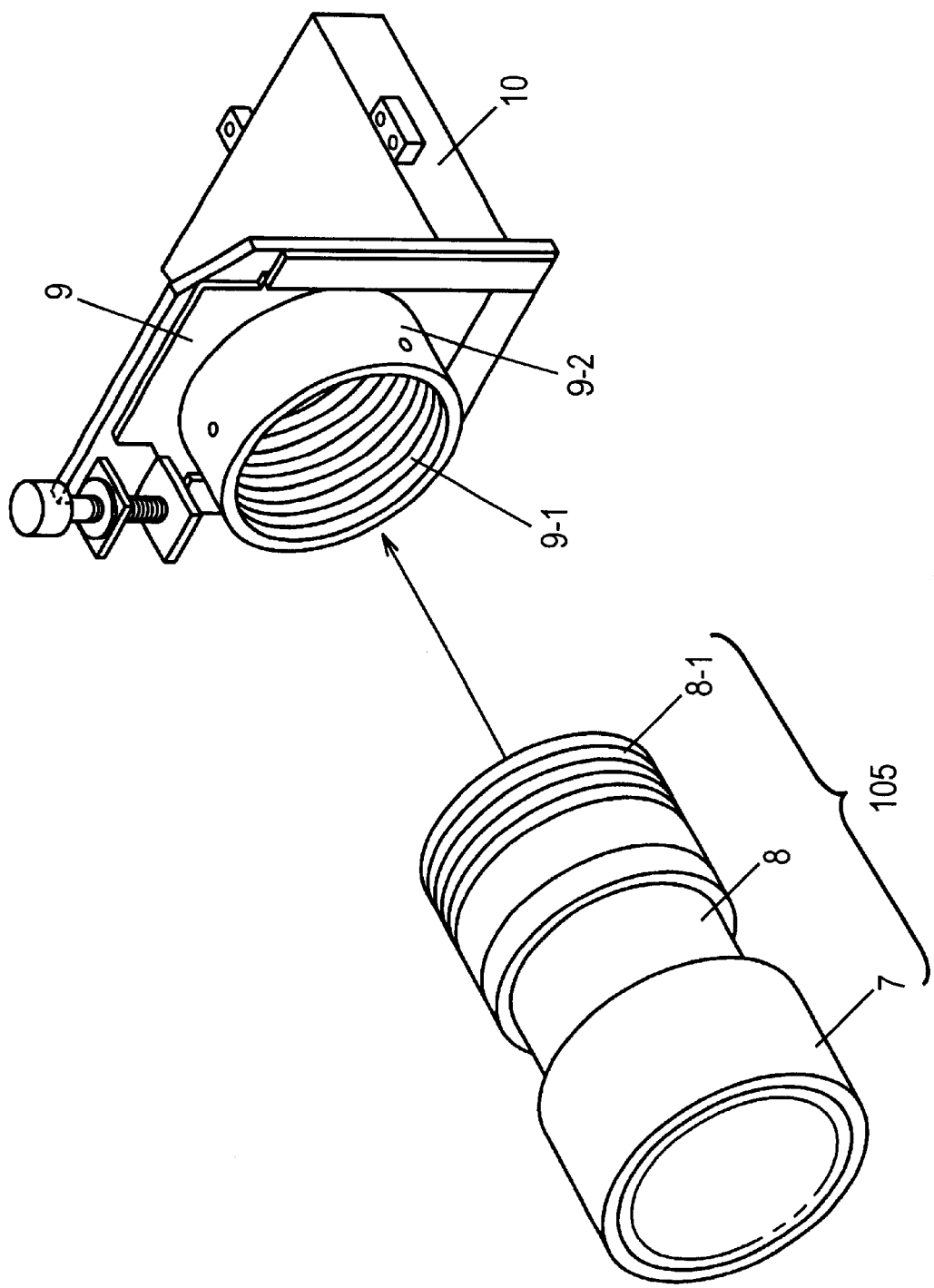
FIG. 2 is a perspective view showing details of the projection lens barrel and the fitting section in accordance with the first embodiment of the present invention.

As shown in FIG. 2, the projection lens unit 105 is formed of an outer barrel 7, an inner barrel 8 and a plurality of unit lenses (not shown). The inner barrel 8 is provided with a screw section 8-1.

Figure 3:
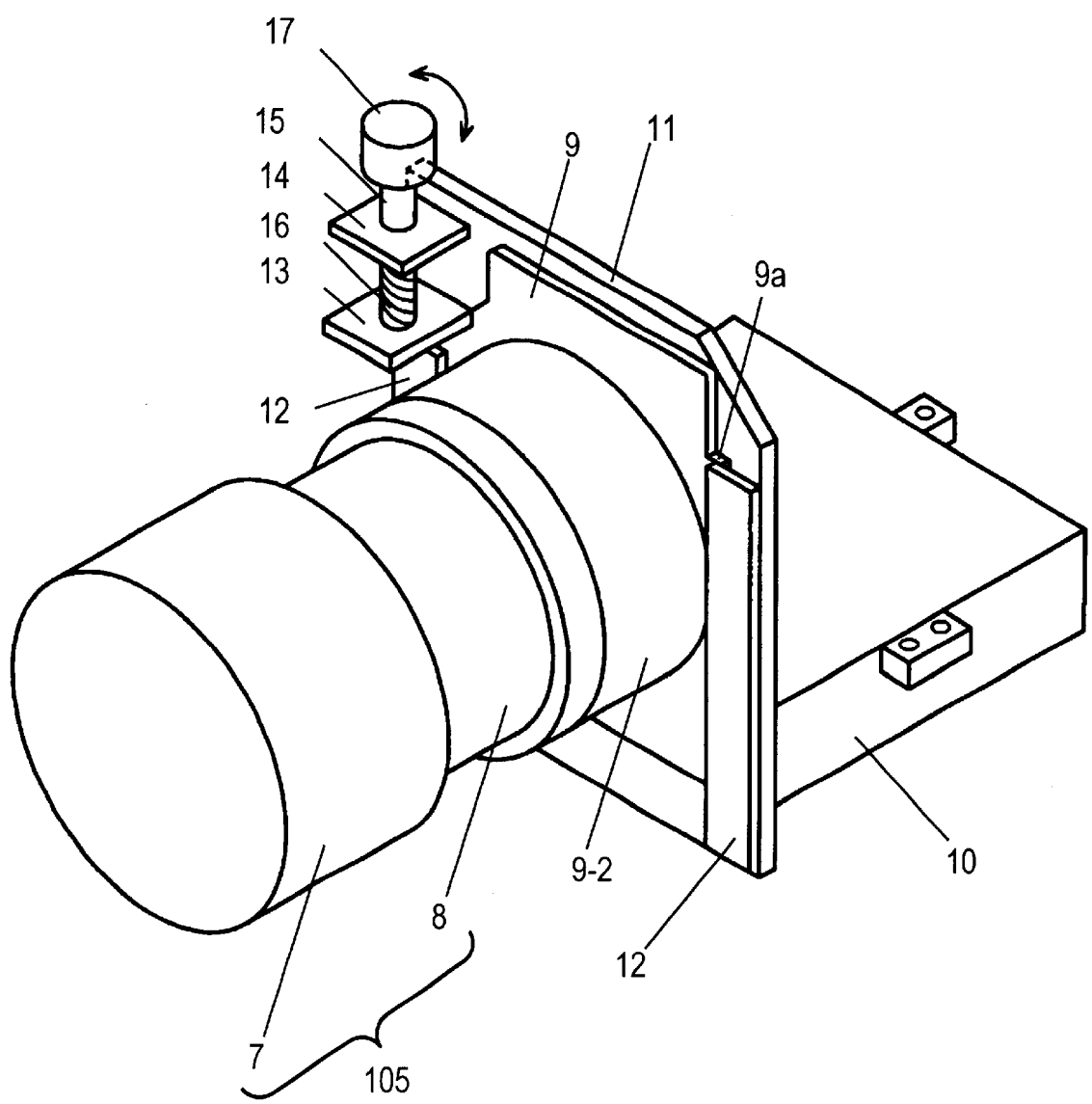
FIG. 3 is a perspective view with the outer barrel and the main barrel of FIG. 2 integrated; a state when the lens is shifted down.

The optical base is formed of a holding base 11 disposed perpendicularly to a prism stand 10 in the shape of a letter "L", and the holding base 11 is provided with a supporting plate 12 in the right and the left sides. The liquid crystal panel 3 is mounted fixed on the optical base. The lens holding member 9 is supported, as shown in FIG. 2 and FIG. 3, so that it can slide up and down along the holding base 11 of optical base guided by the supporting plates 12 disposed at both sides of the holding base 11. The lens holding member 9 is provided with an open outer cylindrical section 9-2 forming a single-body component together with the lens holding member 9. The projection lens unit 105 is fitted to the outer cylindrical section 9-2 by screwing the screw section 8-1 of inner barrel 8 into a screw section 9-1 provided in the outer cylindrical section 9-2.

Although in FIG. 2 the screw section 9-1 is formed inside of the outer cylindrical section 9-2 while the screw section 8-1 is formed on the outer surface of inner barrel 8, the screw section 9-1 may be formed instead on the outer surface of the outer cylindrical section 9-2 while the screw section 8-1 inside of the inner barrel 8, for providing the same function.

A pivot pedestal 14 is provided at a corner of the holding base 11 corresponding to the position of a nut 13, and the shift rod 15 is affixed revolvable to the pivot pedestal 14. In the upper part of shift rod 15, a revolving knob 17 is provided, while in the other end a screw section 16 is formed to be engaged with the nut 13, which nut has been formed together with the lens holding member 9 as a one-piece component. By turning the shift rod 15 the nut 13 moves up and down moving the lens holding member 9 and the projection lens unit 105 up and down altogether.

Figure 5A:
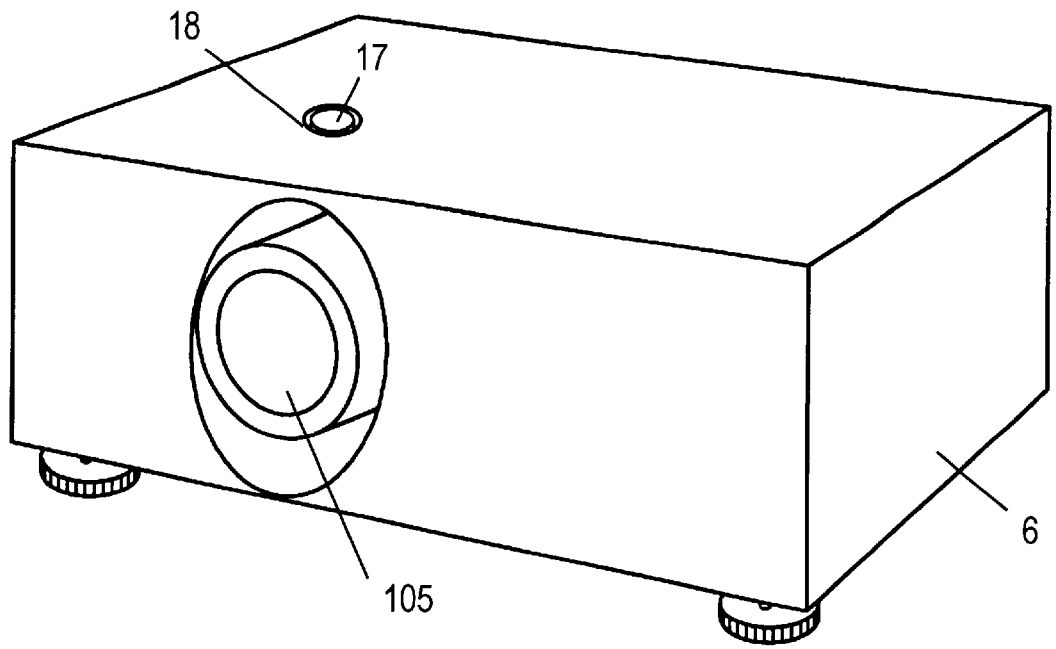
FIG. 5A is a perspective view of a cabinet of projector, with the revolving knob retracted.
Figure 5B:
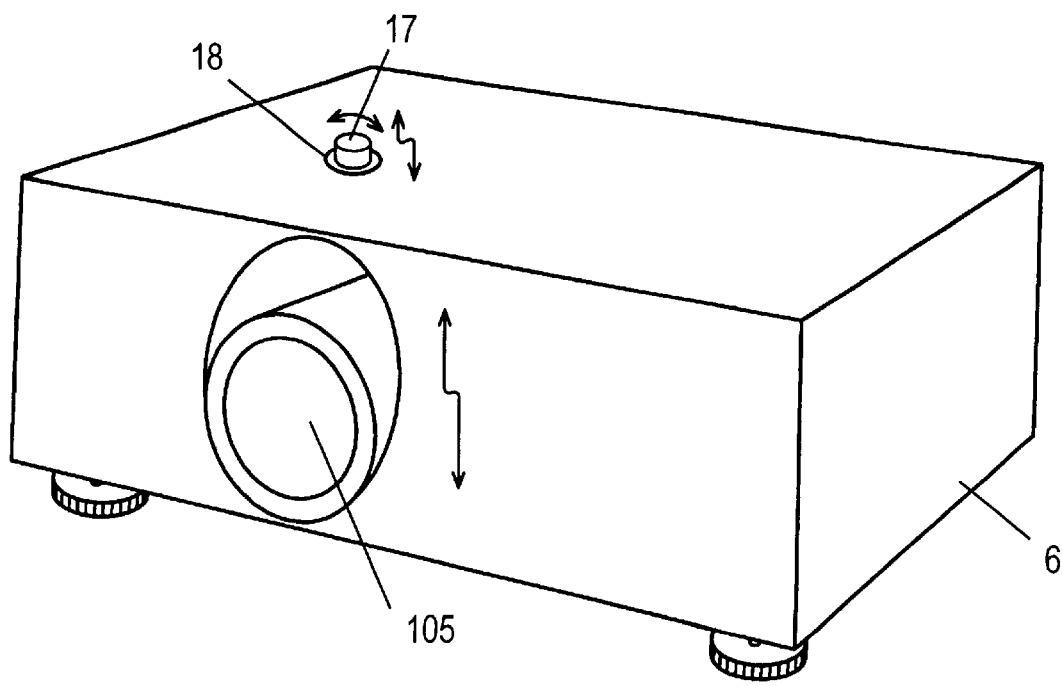
FIG. 5B shows the cabinet of FIG. 5A, with the revolving knob popping up.

The revolving knob 17 is handled through a hole provided in the top board of cabinet 6 at a place corresponding to the revolving knob 17, as shown in FIG. 5A and FIG. 5B. In the present exemplary embodiment, a push-push type revolving knob is employed, as a preferred example, for the revolving knob 17. The push-push type knob is a knob which pops up at one push and sinks at the next push. When the projection lens does not to be adjusted in the height, the revolving knob 17 stays at a lowered position, the top surface of the knob being almost in the same level as the top surface of cabinet 6. For adjusting the height of projection lens, the revolving knob 17 is popped up by one push, which is restored to the lowered position by another push after the adjusting is completed.

The holding base 11, the supporting plates 12 and the prism stand 10 are prepared together as a one-piece component by aluminum die-casting, resin molding or such other methods.

In the same manner, the lens holding member 9, the outer cylindrical section 9-2 and the nut 13 are also prepared together as a one-piece component.

FIG. 3 and FIG. 5B illustrate a state when the projection lens unit 105 is moved down to the lowest position.

Figure 4:
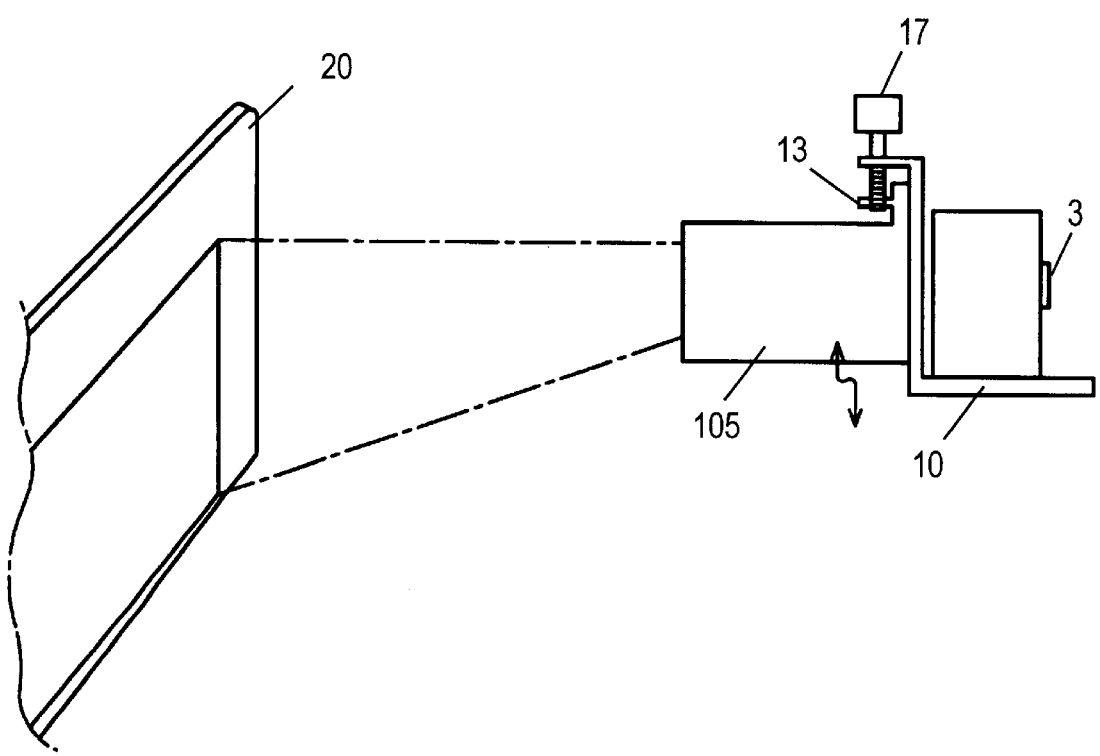
FIG. 4 illustrates a state of projection, with the projection lens unit of FIG. 2 shifted down.

Initially, the optical axis of projection lens unit 105 is coincidental with the center axis of liquid crystal panel 3. The optical axis of projection lens unit 105 in the present exemplary embodiment is designed to be able to move up and down for approximately 20 mm relative to the center axis of liquid crystal panel 3 for a type 1.3 liquid crystal panel (approximately 32.5 mm diagonal). Namely, the optical axis of projection lens unit 105 can be moved by approximately 10 mm up and down, respectively, from the center axis of liquid crystal panel 3. FIG. 4 illustrates a model of image projection on a screen 20 with the projection lens shifting down.

As described above, in a liquid crystal projector of the present invention the projection lens can be shifted up and down easily with a simple mechanism.

Furthermore, the projection lens may be unscrewed from outside the front panel of cabinet and replaced with other projection lens that has a screw section.

Embodiment 2

A second exemplary embodiment of the present invention relates to a bayonet socket structure that holds and fixes a projection lens unit by turning for about a half turn after it is inserted therein through the front panel of cabinet to the lens holding member.

Figure 8:
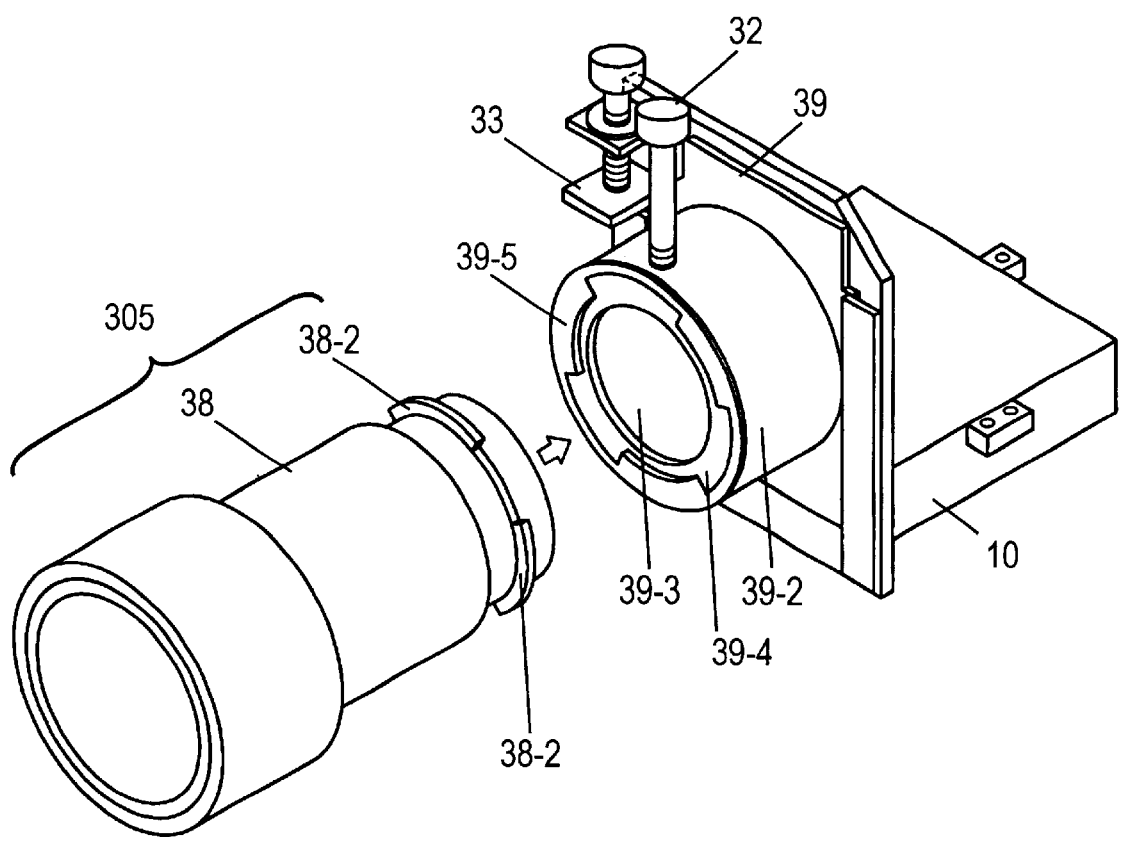
FIG. 8 is a perspective view showing details of a projection lens barrel and the fitting section in accordance with a second exemplary embodiment of the present invention.
Figure 9A:
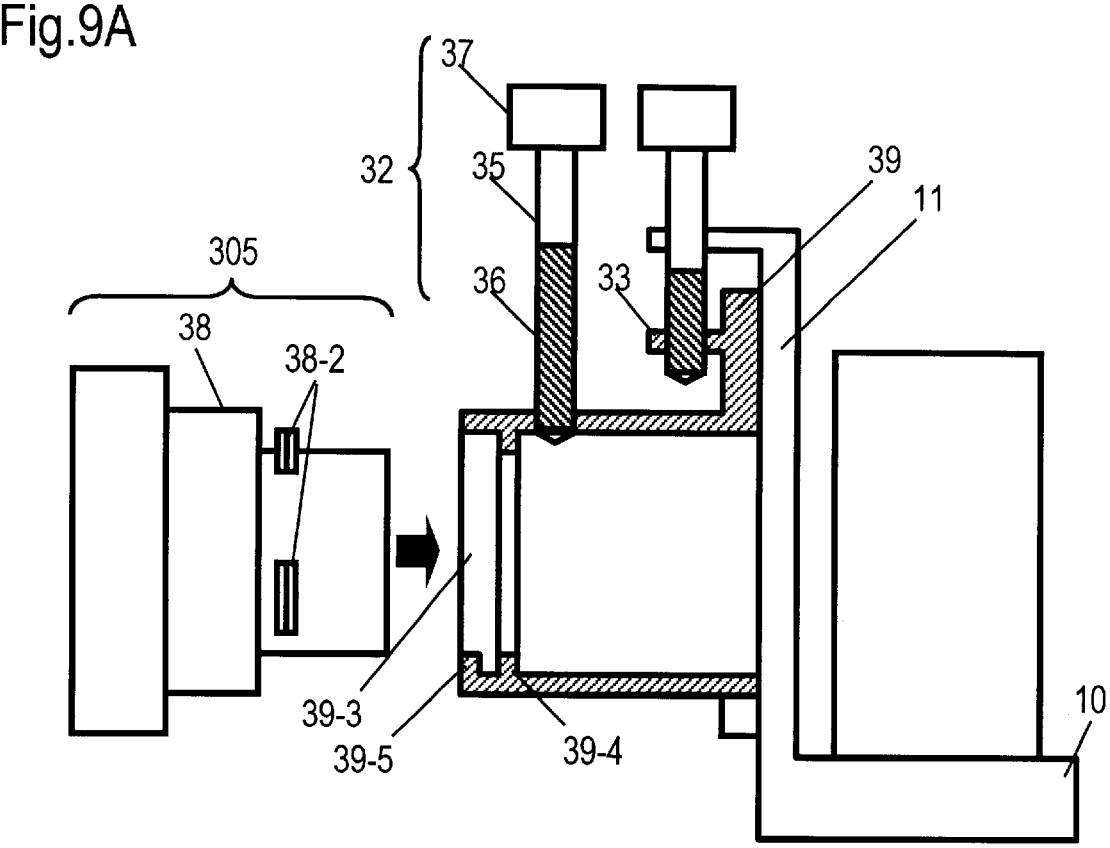
FIG. 9A shows a partially sectioned side view of the projection lens unit and the lens holding member of FIG. 8; a state before both items are coupled together.
Figure 9B:
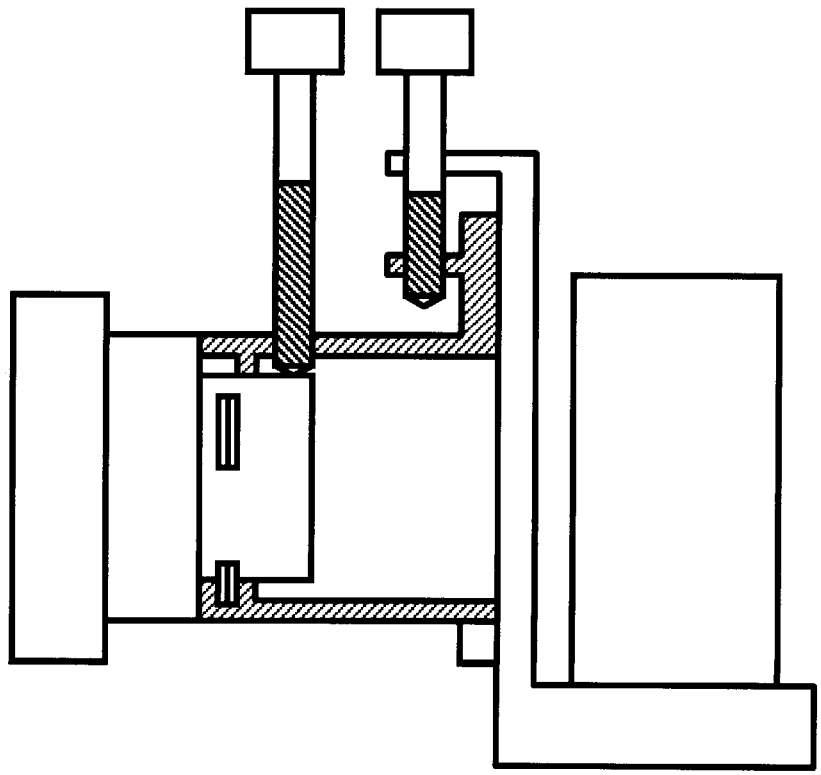
FIG. 9B shows a partially sectioned side view of the projection lens unit and the lens holding member of FIG. 8; a state after both items are coupled together.

A second exemplary embodiment is described with reference to FIG. 8, FIG. 9A and FIG. 9B. Those items having the same function as in the embodiment 1 are represented by providing the same symbols. The lens holding member 39 and the open outer cylindrical section 39-2 are formed together as a one-piece component. The outer cylindrical section 39-2 is provided with an opening 39-3 for accepting projection lens unit, a fixing section 39-4 for fixing the lens unit by the turn for a certain revolution angle, a stopper mechanism 32 for preventing the projection lens unit 305 from withdrawing, and a coupling section 39-5 for providing a sliding coupling. The projection lens unit 305 is provided with a plurality of flanges 38-2 around barrel 38 at a place opposing to the lens holding member 39, as shown in FIG. 9A and FIG. 9B. The flange 38-2 is clamped and fixed when projection lens unit is inserted in the opening 39-3 and turned for a certain revolution angle. The stopper mechanism 32 in the present exemplary embodiment assumes a similar configuration to that of the revolving knob and shaft in embodiment 1 used for shifting the lens holding member up and down. In the same manner as in the illustration in FIG. 5A and FIG. 5B representing the embodiment 1, a revolving knob 37 is provided in the upper part of shift rod 35, while in the other end a screw section 36 is formed. The revolving knob 37 is handled through a hole provided in the top board of cabinet 6 (not shown) at a place corresponding to revolving knob 37. In the present exemplary embodiment, a push-push type revolving knob is employed, as a preferred example, for the revolving knob 37. The push-push type knob is a knob which pops up at one push and sinks at the next push. When the projection lens does not to be replaced, the revolving knob 37 stays at a lowered position, the top surface of the knob being almost in the same level as the top surface of cabinet 6 (not shown). For replacing the projection lens unit, the revolving knob 37 is popped up by one push, which is restored to the lowered position by another push after the replacing operation is completed and other projection lens unit is fixed fastened as shown in FIG. 9B. Although in the present exemplary embodiment the projection lens unit is fixed fastened by making use of a revolving action of the revolving knob 37, it is not the intention to limit the fastening mechanism to such a system.

Both the outer cylindrical section 39-2 and the nut 33 are formed on the lens holding member 39 as a one-piece component, in the same manner as in the earlier example.

By the turn of the shift rod 15, the lens holding member 39 and the projection lens unit 305 in the present embodiment also move up and down altogether, in the same manner as in the embodiment 1.

Embodiment 3

A third exemplary embodiment of the present invention relates to a stopper mechanism that holds and fixes a projection lens unit inserted, likewise the first embodiment, from the front panel of cabinet to the lens holding member.

Figure 10A:
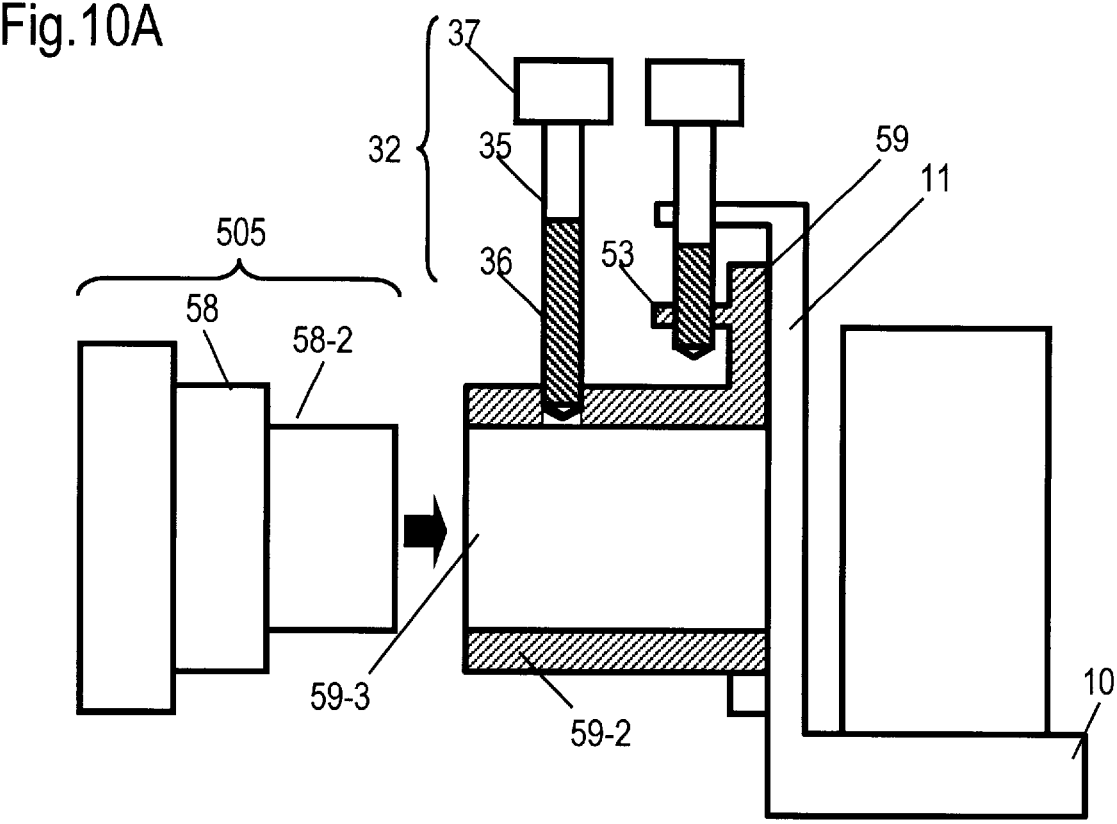
FIG. 10A shows a partially sectioned side view of the projection lens unit and the lens holding member in accordance with a third exemplary embodiment of the present invention; a state before both items are coupled together.
Figure 10B:
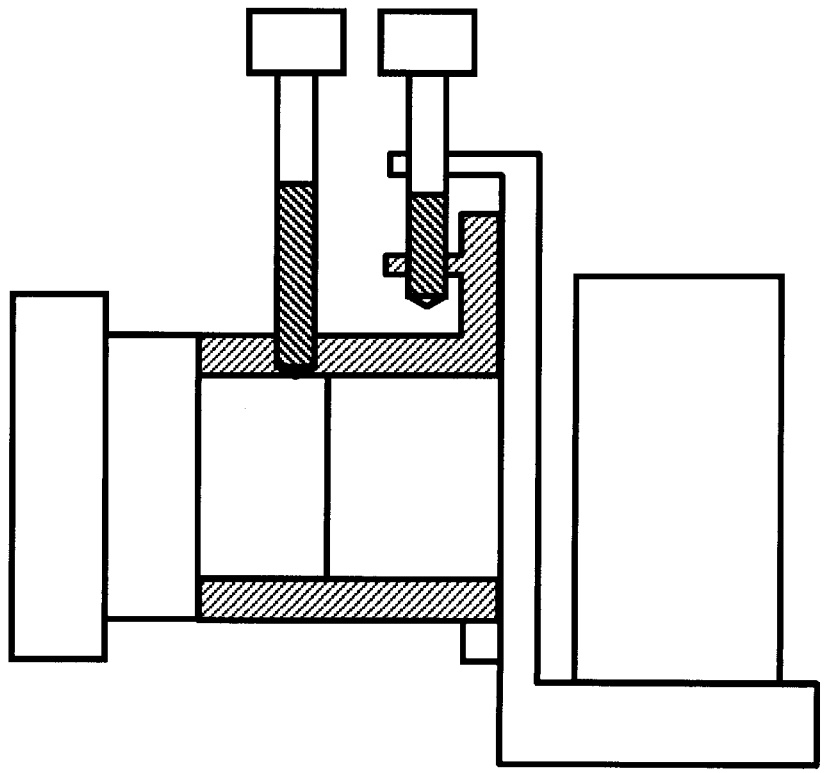
FIG. 10B shows a partially sectioned side view of the projection lens unit and the lens holding member of FIG. 10A; a state after both items are coupled together.

A third exemplary embodiment is described with reference to FIG. 10A, and FIG. 10B. Those items having the same function as in the embodiment 1 are represented by providing the same symbols. The lens holding member 59 and the open outer cylindrical section 59-2 are formed together as a one-piece component. The outer cylindrical section 59-2 is provided with an opening 59-3 for accepting projection lens unit 505, and a stopper mechanism 32 for preventing the projection lens unit 505 from withdrawing. The projection lens unit 505 is provided at one end of barrel 58 opposing to the lens holding member 59 with a cylinder section 58-2, as shown in FIG. 10A and FIG. 10B. The cylinder section 58-2 is inserted in the opening 59-3 to be fixed there by a stopper mechanism 32 that has the same structure as that in the embodiment 2. Although the projection lens unit is fixed and fastened by means of the revolving action of revolving knob 37 in the present embodiment, it is not the intention to limit the mechanism to such a system.

The outer cylindrical section 59-2 and the nut 53 are formed together on the lens holding member 59 as a one-piece component, in the same manner as in the earlier examples.

By turning the shift rod 15, the lens holding member 59 and the projection lens unit 505 in the present embodiment move up and down altogether, in the same manner as in the embodiment 1.

Embodiment 4

A fourth exemplary embodiment of the present invention relates to a liquid crystal projector that can use a cine film projection lens for the projection. The cine film projection lenses are disposed at a certain distance from cine film surface and project an image in the film magnified on a screen.

Figure 11:
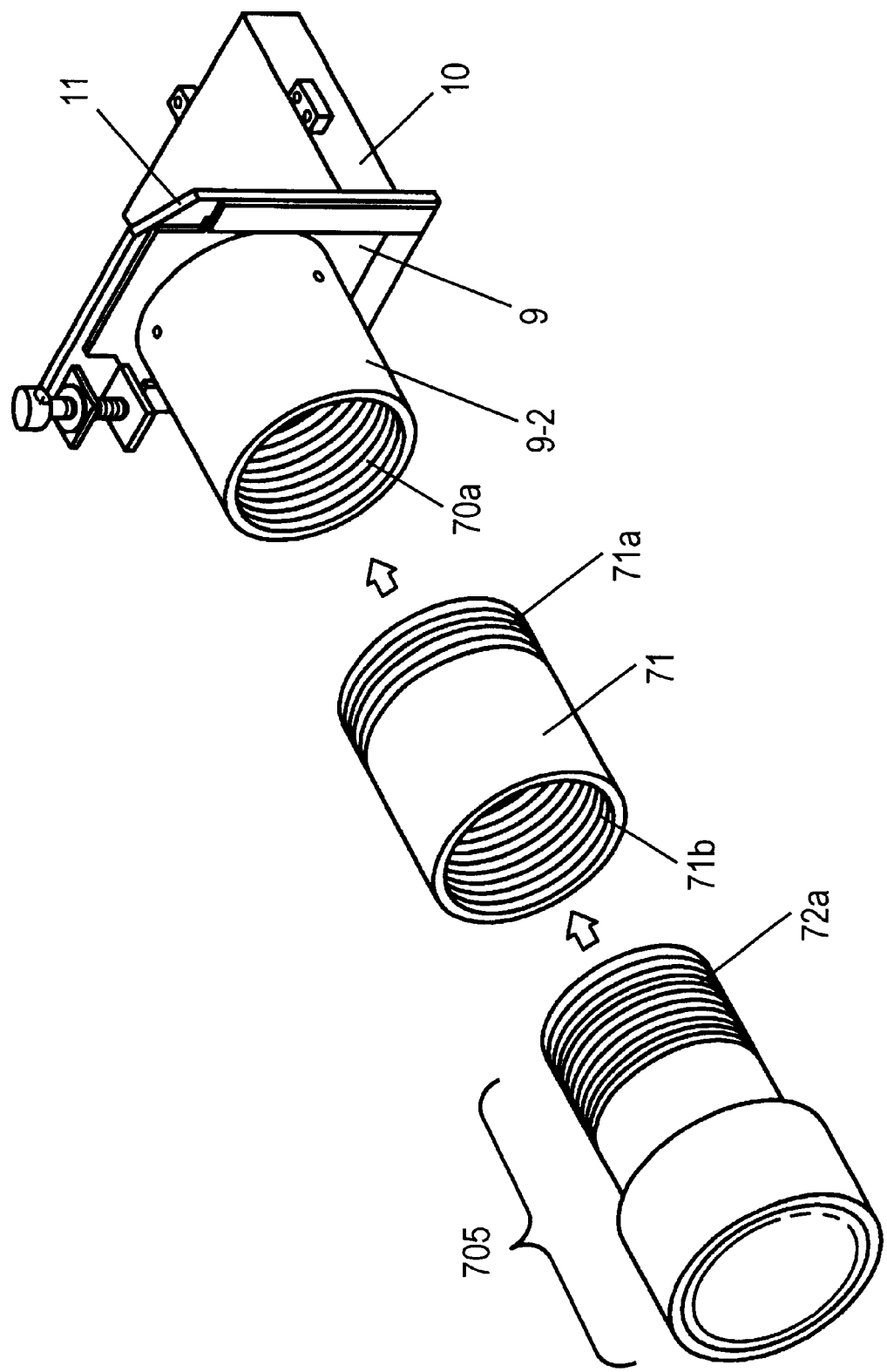
FIG. 11 is an exploded perspective view showing a lens unit in accordance with a fourth exemplary embodiment of the present invention.
Figure 12:
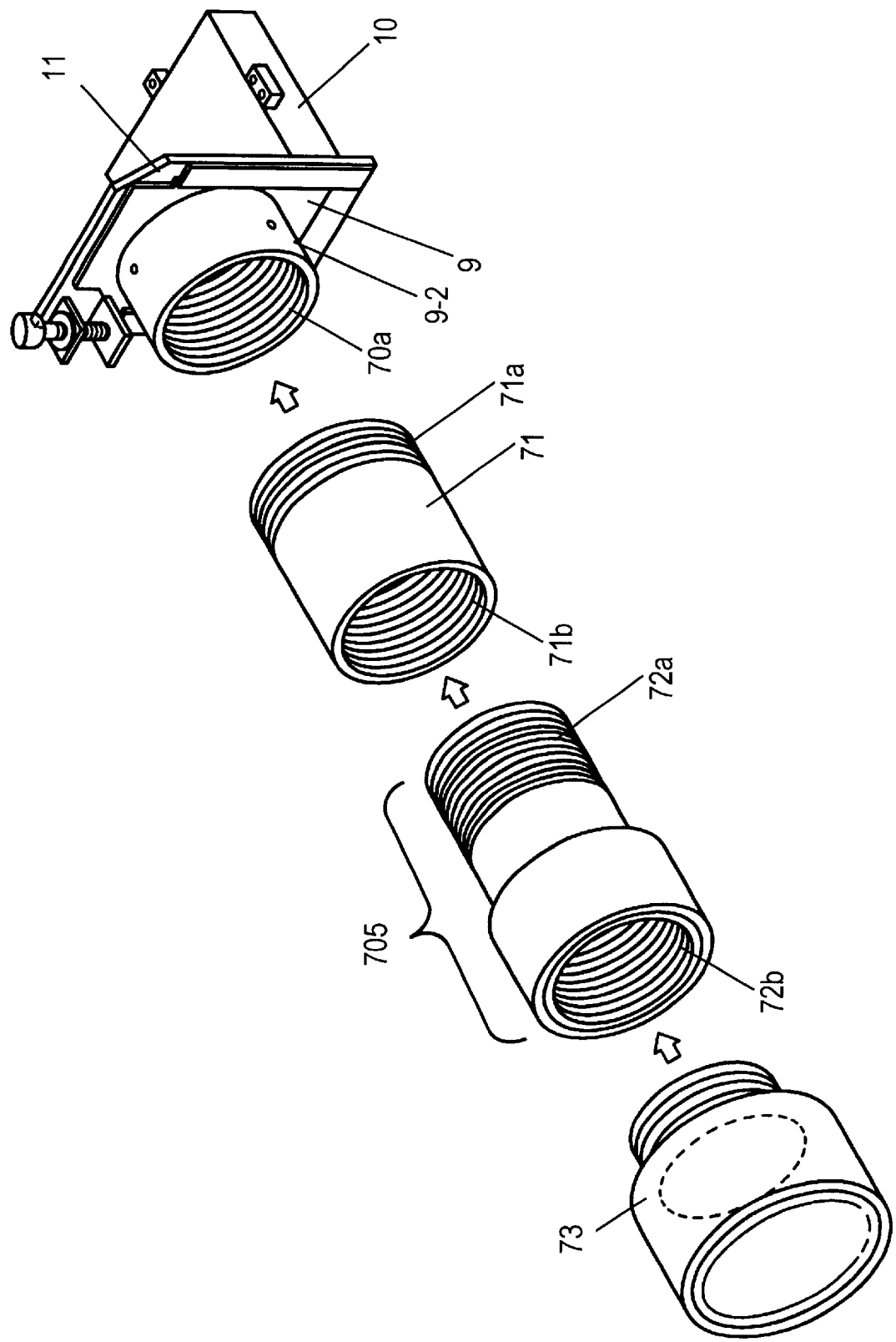
FIG. 12 is an exploded perspective view of the lens unit of FIG. 11, with an additional lens unit attached thereto.
Figure 13:
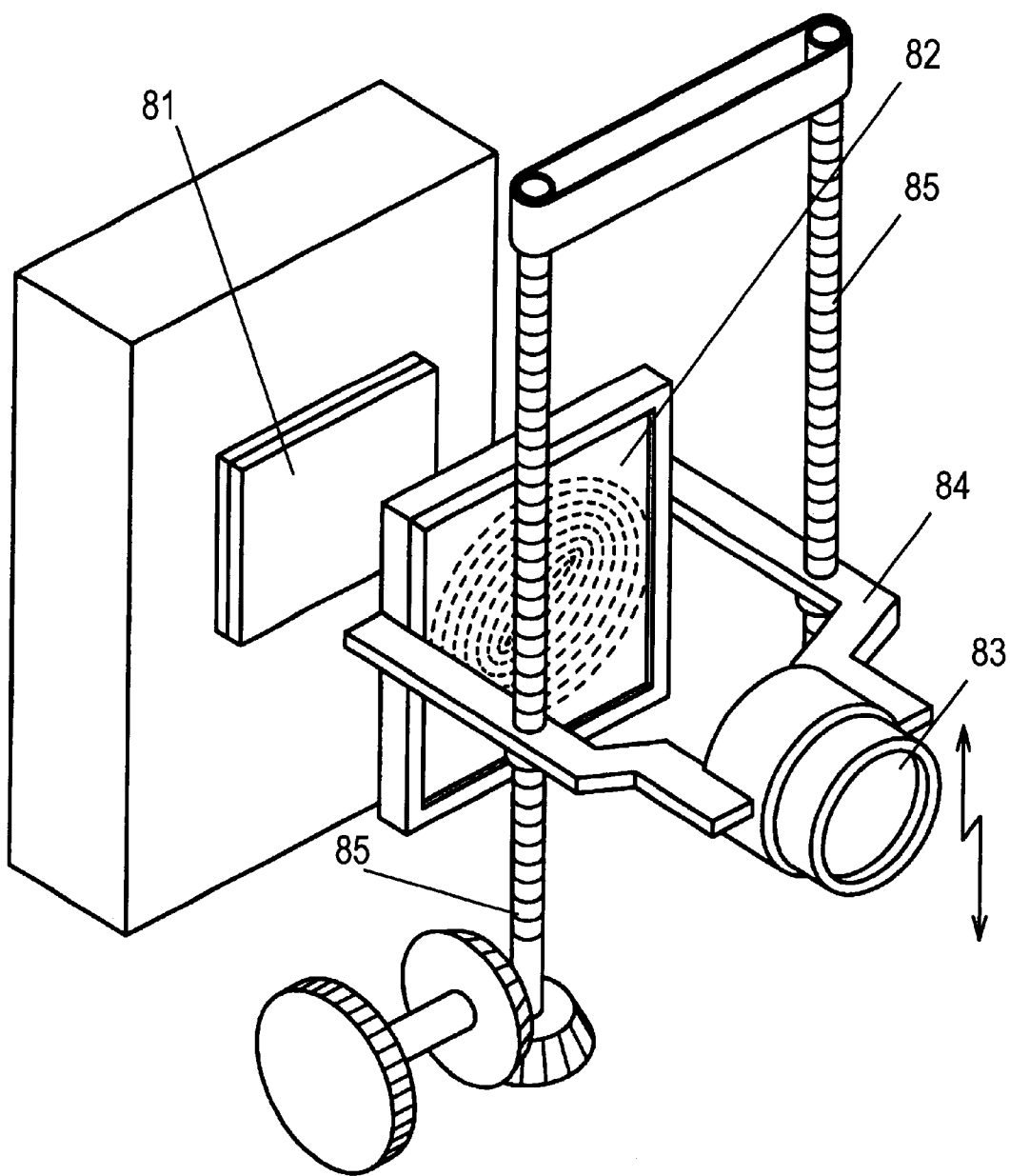
FIG. 13 is a perspective view of a conventional liquid crystal projector.
Figure 14:
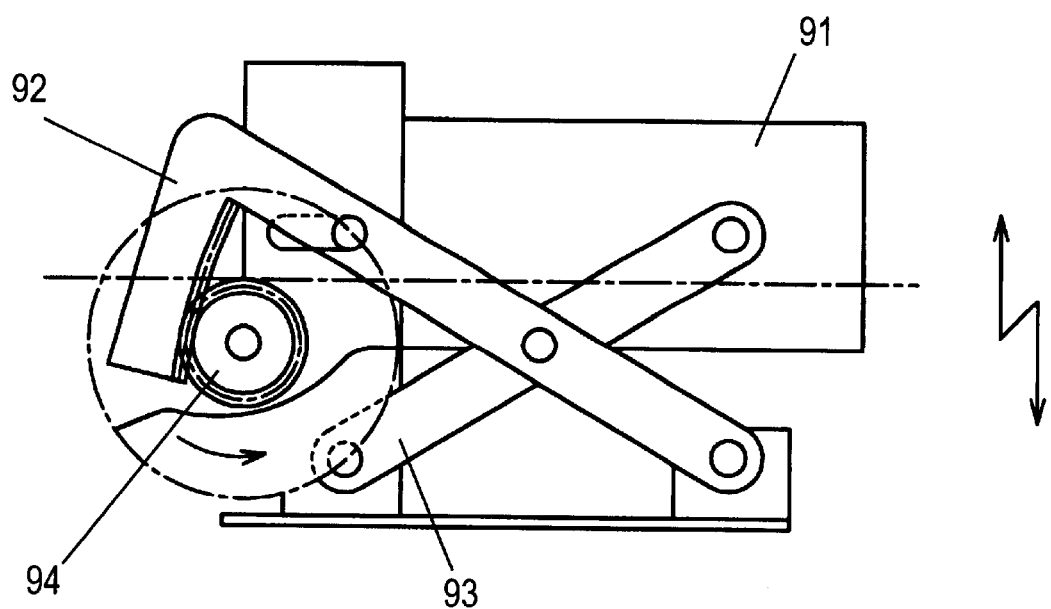
FIG. 14 is a side view of a projection lens unit in another example of conventional liquid crystal projector.

A fourth exemplary embodiment is described with reference to FIG. 11, and FIG. 12. Those items having the same function as in the embodiment 1 are represented by providing the same symbols. FIG. 12 is a perspective view showing the lens system of FIG. 11, with the outer barrel and the main barrel separated each other, plus an anamorphic lens to be integrated thereto.

Figure 6:
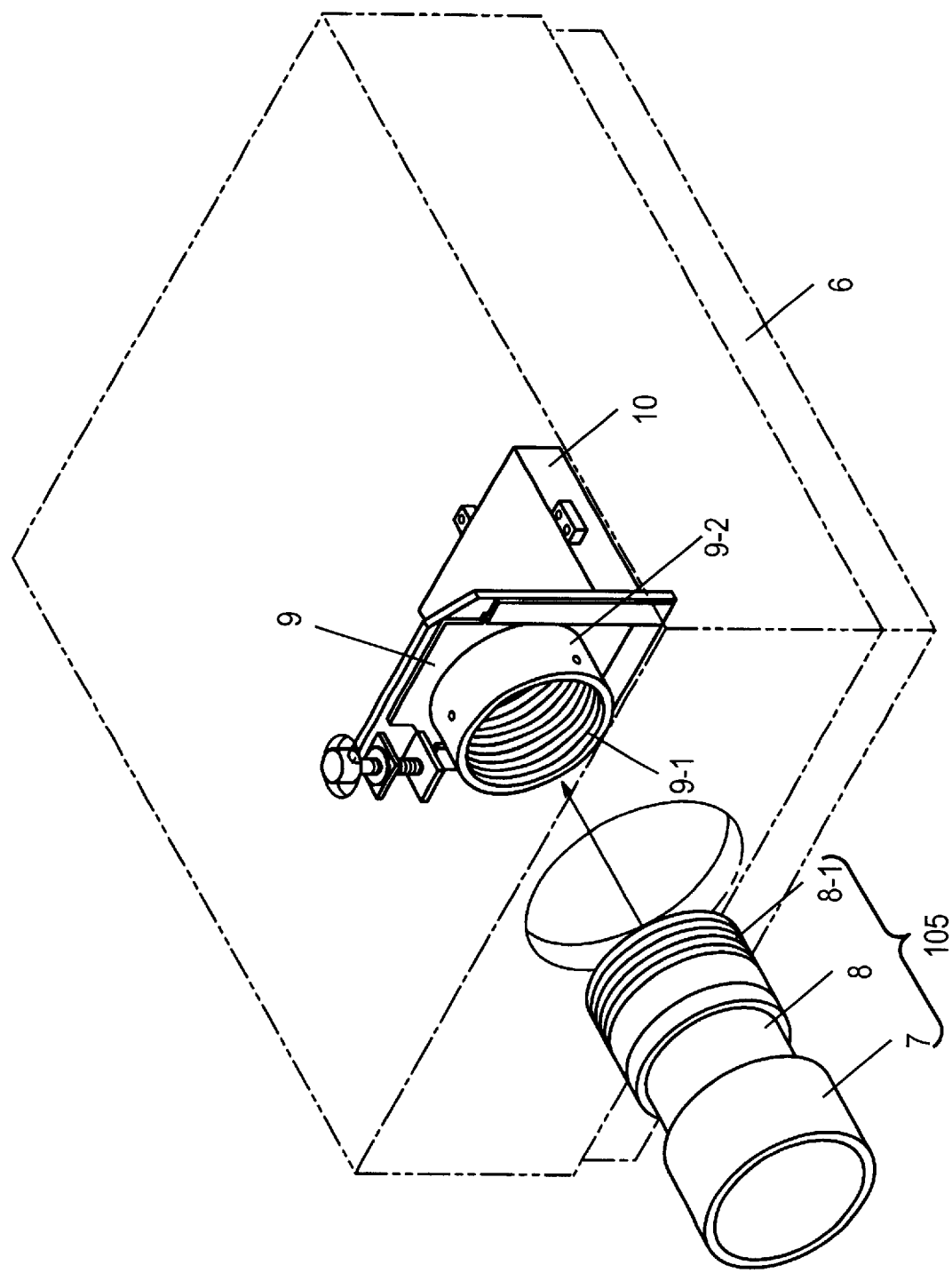
FIG. 6 is an exploded perspective view of the projector in the first embodiment, in a state before the projection lens unit is mounted to the lens holding member.
Figure 7:
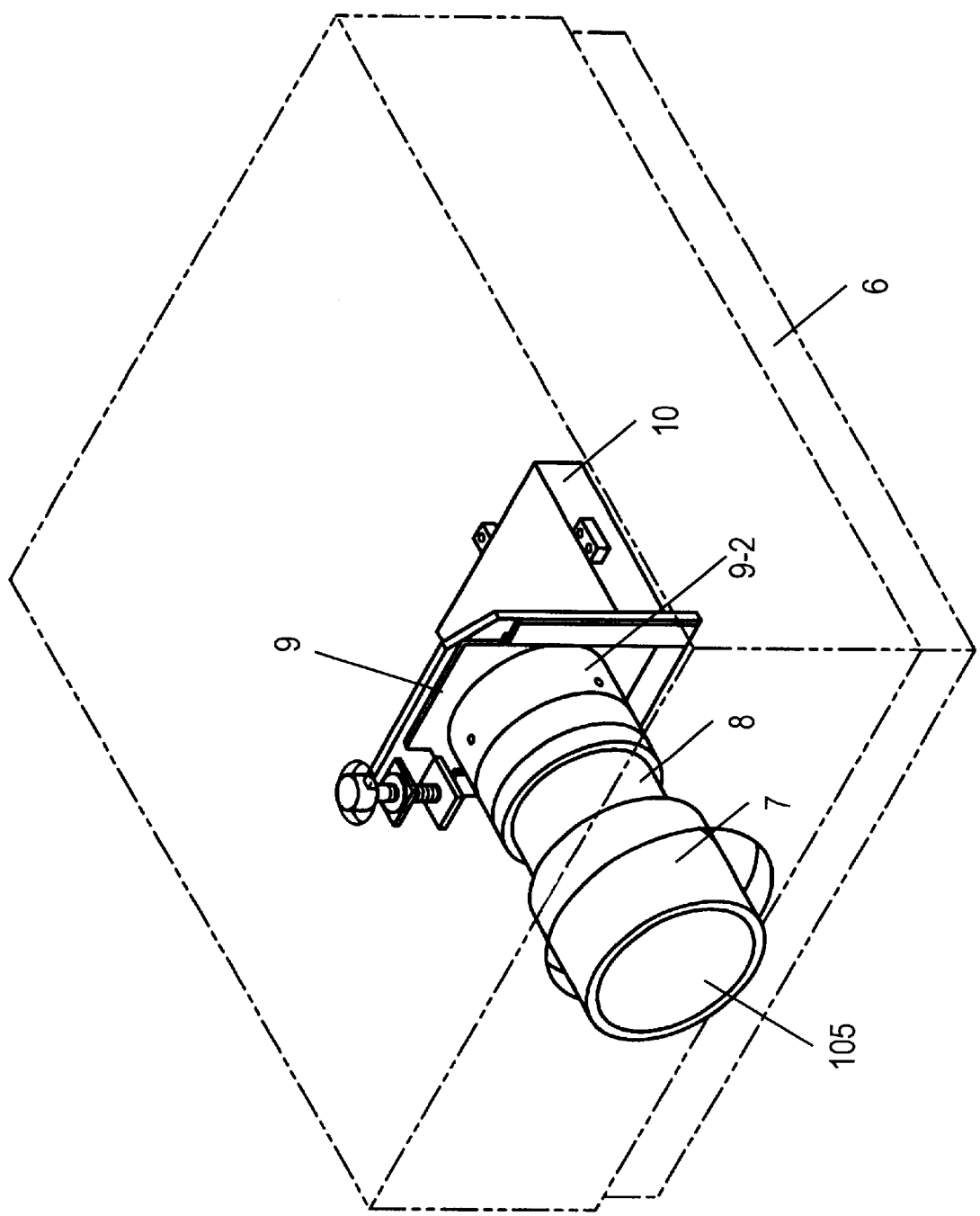
FIG. 7 is a perspective view of the projector in the first embodiment, in a state where the projection lens unit is mounted in the lens holding member.

A cine film projection lens 705 is an embodiment 4 counterpart of the projection lens unit 105 in FIG. 6. In the present embodiment 4, an intermediary tube 71 is provided between the outer cylinder section 9-2 of lens holding member 9 and the cine film projection lens 705.

The same outer cylinder section 9-2 as in FIG. 6, which has been integrated together with the lens holding member 9 as a one-piece component, is supported by the holding base 11.

The cine film projection lens 705 is coupled with the intermediary tube 71 by screwing a screw section 72*a* into a screw section 71*b* for forming a single-piece component. The intermediary tube 71 is screwed at the screw section 71*a* into the screw section 70*a* of the outer cylindrical section 9-2 to be fixed therein. The screw diameter of screw section 71*b* of intermediary tube 71 is designed so as to be fitting with the screw section 72*a* of cine film projection lens 705. The diameter of screw section 72*a* of cine film projection lens 705 comes in three versions, φ62.5 mm, φ70.6 mm and φ71.8 mm. Accordingly, the intermediary tube 71 is prepared in three versions in the screw diameter 71*b* so that it can couple with the screw section 72*a*, viz. φ62.5 mm, φ70.6 mm and φ71.8 mm.

The liquid crystal panel has an aspect ratio 4:3. An image in the liquid crystal panel is projected magnified on a screen also with the aspect ratio 4:3. The projected picture is sometimes requested to have various aspect ratios, besides the 4:3. FIG. 12 illustrates a method for expanding a 4:3 image of liquid crystal panel in only the lateral direction into the 16:9 HD screen format, the cinema size or the vista size, etc. using a cine film projection lens 705. An anamorphic lens unit 73 formed of a cylindrical lens element, etc. for converting the lateral/longitudinal ratio is attached to the cine film projection lens 705.

The anamorphic lens unit 73 may be attached to the opening 72*b* of cine film projection lens 705 by means of either a fitting with spring or a fitting by screwing. Illustrated in FIG. 12 is an example of the fitting by screwing.

As described in the above, a liquid crystal projector may be used also in a cinema hall, for example, where the locations of projector and screen as well as dimensions of the screen are already fixed as the given conditions, by mounting a cine film projection lens 705 in the lens holding member 9 with the intermediary tube 71 interposed. The use of anamorphic lens unit 73 enables projection of pictures in a size adapted to a screen format.

All these exchange operations of projection lenses, viz. mounting to and detaching from a projection apparatus can be performed by a simple turning action given to the projection lens unit from outside the front panel of the cabinet, without disassembling the internal structures.

In a projector of the present invention, the projection lens can be moved up and down by the turn of a shift rod. In addition, the projection lens itself may be replaced with other projection lenses of longer focal length or, shorter focal length by a simple one-touch operation from the outside by inserting a desired projection lens through a hole provided in the front panel of cabinet into mounting section, keeping outer case of the projection apparatus as it is. Thus the lens exchange operation, which was possible in the conventional projectors only after the outer case was removed, can be done easily from outside the cabinet in the projectors of the present invention. The mechanism for shifting up and down and exchanging the projection lens in the present invention has a quite simple structure, which can be fabricated without substantially incurring additional cost.

A projector of the present invention enables for anybody to replace the projection lens with an optional projection lens (short focal distance, long focal distance) that is suitable to a given projection distance, and project pictures of an appropriate size on a screen free of trapezium deformation.

Like the example in embodiment 1, the lens holding member 9 and the projection lens unit in the present embodiment move up and down altogether along with revolution of the shift rod 15.

Furthermore, like the example in embodiment 1, the projection lens unit in the present embodiment may be unscrewed from outside the front panel of cabinet and replaced with other projection lens unit having a screw section.

Although the intermediary tube 71 and the lens holding member 9 in the present embodiment have been coupled and fixed together using the same structure as the embodiment 1, the coupling and fixing of the two items may also be attained through the structures of embodiment 2 or embodiment 3, for yielding the same effect.

What is claimed is:

1. A liquid crystal projector with a light source comprising:
   a) a group of mirrors for splitting and composing color beam generated by said light source;
   b) a liquid crystal panel for controlling the transmission of said color beam;
   c) a lens holding member provided with a mechanism for attaching and detaching a projection lens unit that can move up and down together with the projection lens unit mounted thereon;
   d) a shift rod engaged revolvable with said lens holding member; and
   e) a cabinet for housing said shift rod with at least one of a first hole for allowing said shift rod to pop up disposed at a place corresponding to the top end of said shift rod and a second hole for enabling a projection lens unit to be attached to and detached from said lens holding member means.

2. The liquid crystal projector of claim 1, wherein said cabinet further houses said liquid crystal panel, said group of mirrors, said lens holding member, and said shift, said cabinet being provided with the first hole for allowing said shift rod to pop up disposed at a place corresponding to the top end of said shift rod and the second hole for enabling a projection lens unit to be attached to and detached from said lens holding member.

3. The liquid crystal projector of claim 2, further comprising a projection lens unit attached to said lens holding member.

4. The liquid crystal projector of claim 2, wherein a projection lens unit can be attached to and detached from the lens holding member by turning and inserting the projection lens unit through the second hole of cabinet.

5. The liquid crystal projector of claim 1, wherein said lens holding member comprises
   an opening for accepting projection lens unit, and
   a stopper mechanism for preventing the projection lens unit from withdrawing.

6. The liquid crystal projector of claim 5, wherein said cabinet is further provided with a hole for operating said stopper mechanism disposed for preventing said projection lens unit from withdrawing.

7. The liquid crystal projector of claim 1, wherein said lens holding member comprises
   an opening for accepting a projection lens unit, and
   a screw portion for fixing the projection lens unit by the turning.

8. The liquid crystal projector of claim 7, wherein said projection lens unit comprises a plurality of lens barrels and a plurality of unit lenses, one of said lens barrels having been provided with screw section for holding by said lens holding member.

9. The liquid crystal projector of claim 1, wherein said lens holding member comprises
   an opening for accepting a projection lens unit and provided with a fixing section for fixing the projection lens unit by the turning for a certain revolution angle, and
   a stopper mechanism for preventing said projection lens unit from withdrawing.

10. The liquid crystal projector of claim 9, wherein one of the lens barrels of said projection lens unit is provided with a plurality of flanges that are to be inserted in the opening of said lens holding member for fixing by said fixing section.

11. The liquid crystal projector of claim 3, wherein said lens holding member is supported to be sliding up and down by an optical base on which the liquid crystal panel is mounted, which lens holding member moving up and down while holding the projection lens unit in accordance with revolution of the shift rod.

12. The liquid crystal projector of claim 1, further comprising an intermediary tube between said lens holding member and a projection lens unit.

13. The liquid crystal projector of claim 12, wherein said projection lens unit can be attached to and detached from said intermediary tube, and said intermediary tube can be attached to and detached from said lens holding portion, respectively, by the turning.

14. The liquid crystal projector of claim 12, wherein said projection lens unit is a cine film projection lens whose screw diameter is approximately 5 mm, $\phi$70.6 mm or $\phi$71.8 mm.

15. The liquid crystal projector of claim 12, wherein the screw diameter of said intermediary tube to be coupled with said projection lens unit is approximately $\phi$62.5 mm, $\phi$70.6 mm or $\phi$71.8 mm.

16. The liquid crystal projector of claim 14, wherein said projection lens unit is provided with an opening for attaching an anamorphic lens that can vary the lateral to longitudinal ratio of an image in a liquid crystal panel.

17. The liquid crystal projector of claim 16, wherein said opening is provided with a screw portion for fixing said anamorphic lens.

* * * * *

UNITED STATES PATENT AND TRADEMARK OFFICE
CERTIFICATE OF CORRECTION

PATENT NO.    : 6,364,491 B1
DATED         : April 2, 2002
INVENTOR(S)   : Okada et al.

It is certified that error appears in the above-identified patent and that said Letters Patent is hereby corrected as shown below:

Column 9,
Lines 23-29, delete "said cabinet being provided with the first hole for allowing said shift rod to pop up disposed at a place corresponding to the top end of said shift rod and the second hole for enabling a projection lens unit to be attached to and detached from said lens holding member".

Column 10,
Line 33, after the word "approximately" insert -- φ62. --.

Signed and Sealed this

Seventeenth Day of December, 2002

JAMES E. ROGAN
*Director of the United States Patent and Trademark Office*